United States Patent [19]

Hansen

[11] 4,046,280
[45] Sept. 6, 1977

[54] DIRECT MOUNTING REVERSE BUCKLING DISC

[75] Inventor: Franklin A. Hansen, Raytown, Mo.

[73] Assignee: Continental Disc Corporation, Riverside, Mo.

[21] Appl. No.: 702,734

[22] Filed: July 6, 1976

[51] Int. Cl.² .................... B65D 25/00; F16K 17/14
[52] U.S. Cl. ............................... 220/89 A; 137/68 R
[58] Field of Search .............. 220/89 A; 137/68–71, 137/797, 68; 251/61; 92/98 R; 138/89, 90; 222/5; 30/303

[56] References Cited

U.S. PATENT DOCUMENTS

| 2,766,904 | 10/1956 | Philip | 220/89 A |
| 3,834,581 | 9/1974 | Solter et al. | 220/89 A |
| 3,881,629 | 6/1975 | Shaw et al. | 220/89 A |
| 3,908,684 | 9/1975 | Short | 220/89 A X |
| 3,922,767 | 12/1975 | Solter et al. | 220/89 A X |

Primary Examiner—Stephen P. Garbe
Assistant Examiner—Steven M. Pollard
Attorney, Agent, or Firm—Fishburn, Gold & Litman; Fishburn, Gold, et al.

[57] ABSTRACT

A reverse buckling disc arrangement for direct mounting eliminates separate inlet and outlet seating rings for the disc flange. Centering ring units on both sides of the disc have flanges doubling as the seating rings. The centering ring projecting toward the higher pressure supports a screen for protecting the disc dome while permitting necessary flow-through.

6 Claims, 2 Drawing Figures

DIRECT MOUNTING REVERSE BUCKLING DISC

This invention relates to safety pressure release devices, and more particularly to improvements in structures for mounting reverse buckling rupture discs and associated elements.

Reverse buckling rupture discs have found increasing use as precision pressure relief devices which permit working pressures very close to rated rupture pressures. Such devices ordinarily comprise a diaphragm, usually a relatively thin metal, which is centrally bulged and positioned in a pressure relief passageway with the convex surface of the bulge directed toward the higher pressure. To insure rupture when the rated pressure differential is exceeded, a sharp puncturing element, usually in the form of a knife-blade, is often located near the concave surface of the bulge so that upon disc buckling, the collapsing metal is cut.

Heretofore, a common method of mounting such discs and puncturing elements was by insertion between standard ANSI (American National Standards Institute) pipe flanges with the aid of precision base and holddown flanges which sandwiched the disc flange therebetween to insure proper seating. Usually, the puncturing element was welded or otherwise secured to the holddown flange in position for cutting the disc upon reversal. Recent improvements in such arrangements involve mounting the reverse buckling disc together with a puncturing element directly between ANSI type flanges. For example, see U.S. Pat. No. 3,834,581 wherein pre-seated bulged discs are preassembled with a centering ring unit containing a puncturing element and whereby the centering ring unit operably positions both the preseated disc and the puncturing element between the flanges, eliminating the need for precision disc base and disc holddown flanges.

In the practice of the invention described in U.S Pat. No. 3,834,581, seating rings were used in contact with the disc flange, usually on both sides thereof but, at least on the higher pressure side, to insure extensive and precision contact in an attempt to avoid a possible distortion of the disc flange during the tightening of mounting bolts which could affect collapse pressure of the disc. It has now been discovered that such separate seating rings also may be completely eliminated and, instead, reliance for supporting the disc flange placed solely on mounting flanges forming a part of associated elements. Specifically, the flange forming part of the centering ring supporting the knife-blade and the flange associated with a centering ring projecting toward the higher pressure side of the disc produce the entire disc flange contacting support. The latter centering ring also forms an excellent mounting structure for a protective device, such as a screen extending across the circular opening thereof, to provide protection against accidental contact with the disc dome which tends to adversely affect rated collapse pressure.

In the practice of this invention, reverse buckling discs are adapted for mounting, with a puncturing element and protective element, directly between ASA type flanges without the need for disc base and holddown flanges or separate seating rings.

The principal objects of the present invention are: to provide a reverse buckling disc and puncturing element assembly adapted for mounting directly between ANSI type flanges; to provide such an assembly which eliminates the need for disc base and disc holddown flanges; to provide such an assembly which further eliminates the need for separate disc flange seating rings; to provide such a reverse disc arrangement wherein the disc dome is protected against accidental contact which could adversely affect rated collapse pressure; to provide such a reverse disc arrangement which may be quickly placed or replaced into operation without the need for highly skilled personnel; to provide such an arrangement wherein proper seating of the disc is easily obtained for accurate operation whether mounted first on the inlet or outlet pipe flange; to provide such an arrangement wherein proper seating of the disc is easily obtained in difficult locations; and to provide an arrangement which is relatively inexpensive and yet highly reliable in use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the direct mounting disc arrangement.

Figure 1:
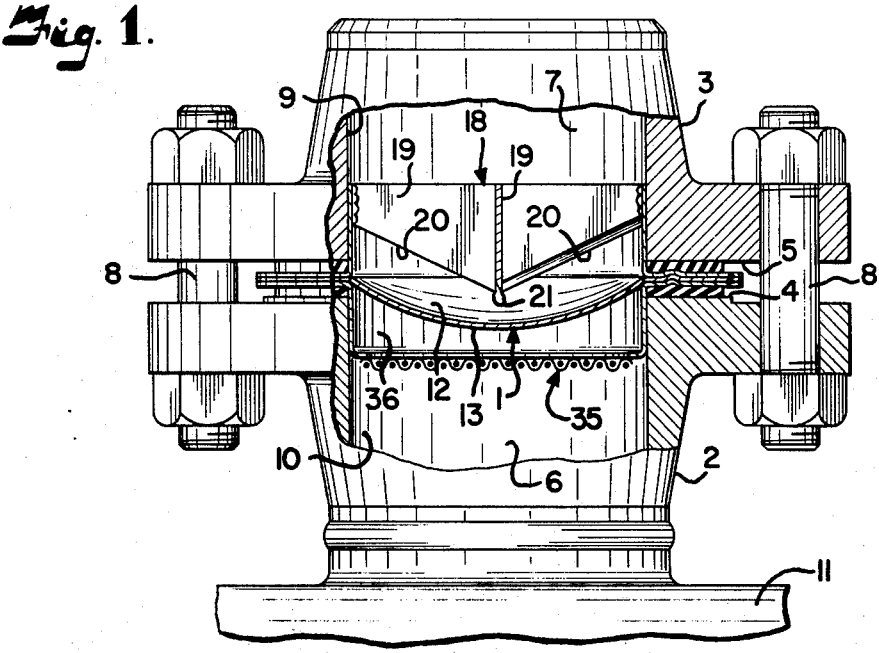
FIG. 1 is a fragmentary cross-sectional view showing a set of ANSI type flanges with a reverse buckling disc arrangement embodying this invention assembled directly therewith in absence of separate seating rings, a portion being broken away to better show the cooperative relationship.

Referring to the drawings in more detail:

The reference numeral 1 generally indicates a safety pressure relief device embodying this invention. The device 1 is shown mounted directly between a pair, or set, of ANSI type flanges, in this example, lower flange 2 and upper flange 3 which are respectively characterized by bodies forming opposed, flat annular faces 4 and 5 surrounding coaxially aligned lower and upper cylindrical bores 6 and 7. A plurality of bolts 8 extend in a conventional circular pattern through the flanges 2 and 3, drawing the respective flange faces 4 and 5 toward contacting relation.

The device 1, in operation, normally blocks flow out of a pressure relief passageway 9 formed by the upper bore 7. The passageway 9, upon actuation of the device 1, forms a continuation of a passageway 10 formed by the lower bore 6 which communicates with a pressure vessel 11 of any suitable configuration.

Figure 2:
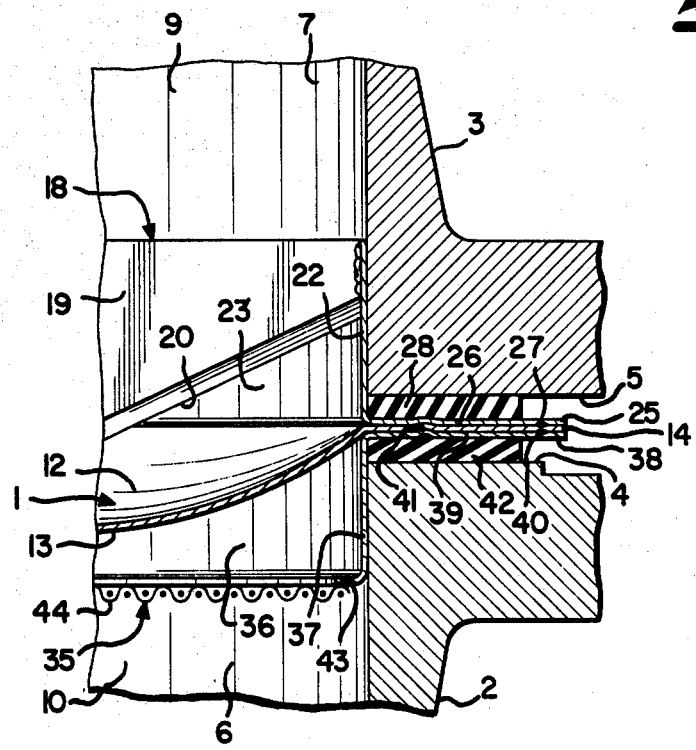
FIG. 2 is a fragmentary, cross-sectional, detailed view on an enlarged scale for depicting the relationship of the parts of FIG. 1.

The device 1 includes, in this example, a rupture disc 12 having a central bulged portion 13 projecting into the passageway 10 and an integral, flat rim or flange portion 14 adapted to extend radially between the flange faces 4 and 5. In the structure of FIGS. 1 and 2, a disc puncturing unit 18 comprises a pair of knife-blades 19 having cutting edges 20 directed toward the concave side of the disc bulged portion 13 and sloping toward a central sharp point 21. The knife-blades 19, in this example, are welded at the ends thereof to the inside cylindrical surface 22 of a centering ring 23, but other mounting arrangements are also contemplated. The centering ring 23 is composed of a cylindrical tubular wall portion 24, forming the surface 22, and an integral, flat rim or flange portion 25. The flange portion 25 projects radially along the upper surface 26 of the disc flange 14 and, in this example, is secured thereto at 27, for example by a circular pattern of spot-welds, although other securing procedures such as a continuous weld or strong adhesive are useful and tend to assure zero leakage therebetween where this is a problem.

The wall portion 24 of the centering ring 23 projects downstream or away from the high pressure side of the disc, and, therefore, in mounting the device 1 between the flanges 2 and 3, the tubular wall portion 24 is telescoped into the cylindrical bore 7 after placing a suitable sealing gasket 28 between the centering ring flange portion 25 and the flange face 5.

A disc protective unit 35 comprises a centering ring 36 composed of a cylindrical tubular wall portion 37 and an integral, flat rim or flange portion 38. The flange portion 38 projects radially along the other surface 39 of the disc flange 14 and, in this example, is secured thereto at 40, for example, by a circular pattern of spot-welds, although other means may be used for leakage control or other reasons, as at 27. Preferably a bite 41 is formed in the flange 38 and bulges slightly toward the disc flange 14, engaging and somewhat deforming the flange 14 along the entire circular extent thereof to also aid in eliminating the possibility of leakage between the flanges 14 and 38.

In mounting the device, the tubular wall portion 37 of the centering ring 36 is telescoped into the cylindrical bore 6 after placing a suitable sealing gasket 42 between a centering ring flange portion 38 and the inlet flange face 4.

With the structure above described, it is essentially immaterial whether the disc assembly is mounted first in the outlet pipe flange 3 or inlet pipe flange 2, the installer being free to select whichever is most convenient under the particular circumstances. Also, separate seating rings are eliminated, thereby substantially reducing cost while providing the advantage of centering structure projecting both axial directions from the disc 12.

In addition, the centering ring 35 provides an excellent seat 43 for mounting a screen 44 which serves to protect the dome of the disc 12 against accidental denting which would adversely affect the rated collapse pressure. The screen 44 is selected in accordance with particular requirements to provide sufficient physical protection while also allowing ample flowthrough relief after disc rupture.

It is to be understood that while certain forms of this invention have been illustrated and described, it is not to be limited to the specific arrangement of parts herein described and shown except insofar as limitations are included in the following claims.

What is claimed and desired to secure by Letters Patent is:

1. In combination, an inlet pipe flange and an outlet pipe flange and a safety pressure relief device mounted directly between said flanges:
  a. said inlet and outlet flanges respectively having radially projecting opposed, flat annular clamping faces, said inlet and outlet flanges each having a bore extending through said flange to said clamping face,
  b. said relief device comprising a rupture disc arrangement having a flange portion extending therefrom, said rupture disc arrangement being of the reverse buckling type having a bulged central portion with a convex side,
  c. a first centering ring comprising a tubular wall portion and a flange portion, and puncturing means mounted at least partially within said first centering ring tubular wall portion, said bulged central portion being directed away from said puncturing means,
  d. said first centering ring tubular wall portion being telescopically received into said outlet bore,
  e. means cooperating between said first centering ring flange portion and disc arrangement flange portion whereby said last named flange portions are radially coaxially retained with respect to each other in absence of said pipe flanges,
  f. a second centering ring comprising a tubular wall portion surrounding said bulged central portion and a flange portion, said second centering ring tubular wall portion forming a mouth and being telescopically received into said inlet bore, means cooperating between said second centering ring flange portion and disc flange portion whereby said last named flange portions are radially coaxially retained with respect to each other in absence of said pipe flanges, and
  g. means clamping said first and second centering ring flange portions and rupture disc flange portion in sandwiched arrangement between said pipe flanges.

2. The combination as set forth in claim 1 including:
  a. a circular bite in said second centering ring flange portion and engaging said disc flange.

3. The combination as set forth in claim 1 wherein said first centering ring flange portion and said disc flange portion and said second centering ring flange portion are fixed with respect to each other by means of spot-welds.

4. The combination as set forth in claim 1 wherein said first centering ring flange portion and said disc flange portion and said second centering ring flange portion are fixed with respect to each other by means of continuous welds.

5. The combination as set forth in claim 1 wherein said first centering ring flange portion and said disc flange portion and said second centering ring flange portion are fixed with respect to each other by means of adhesive.

6. The combination as set forth in claim 1 wherein:
  a. a protective flow-through member is mounted on said second centering ring and extends across said mouth in spaced relation to said convex side of said bulged central portion.

* * * * *